Aug. 25, 1925.
C. E. JOHNSON
GRINDING MACHINE
Filed April 3, 1924      6 Sheets-Sheet 4
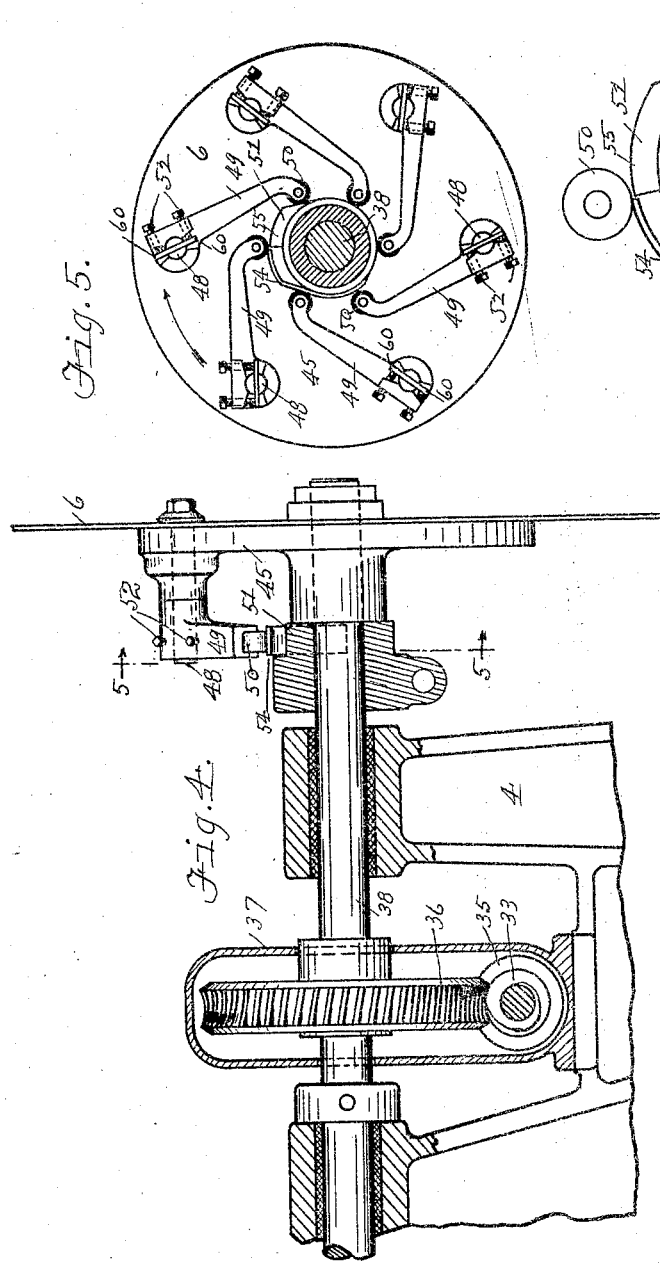

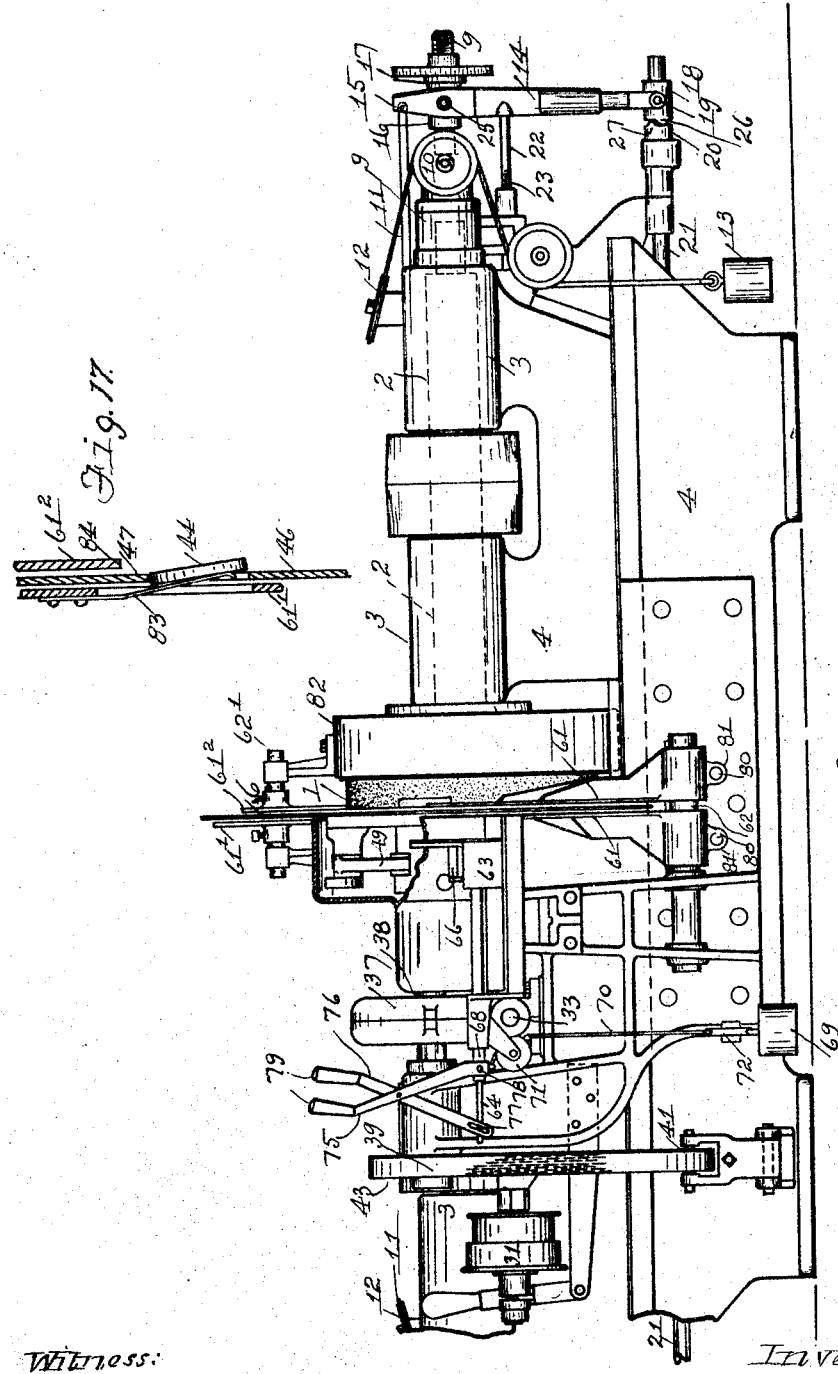

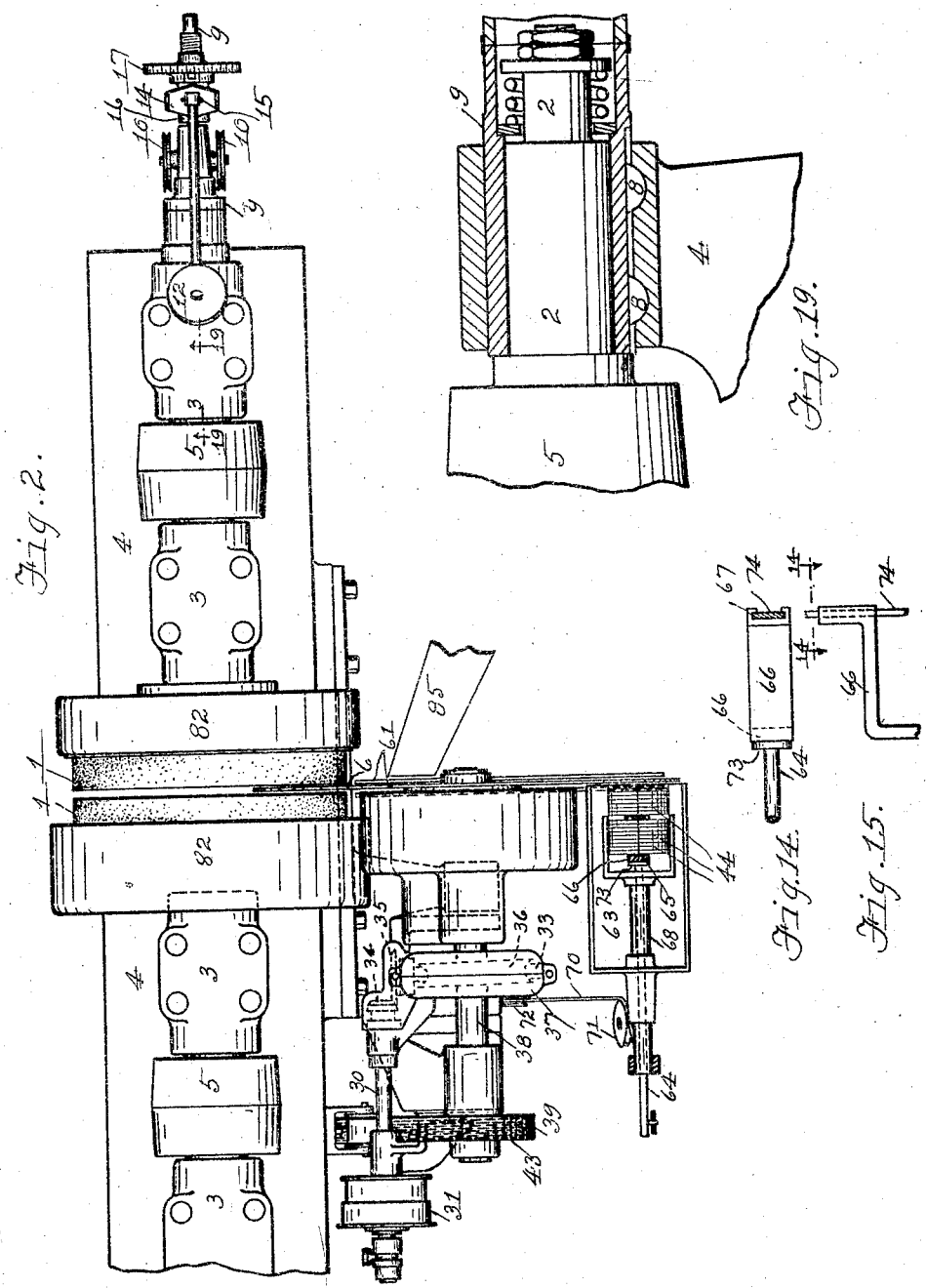

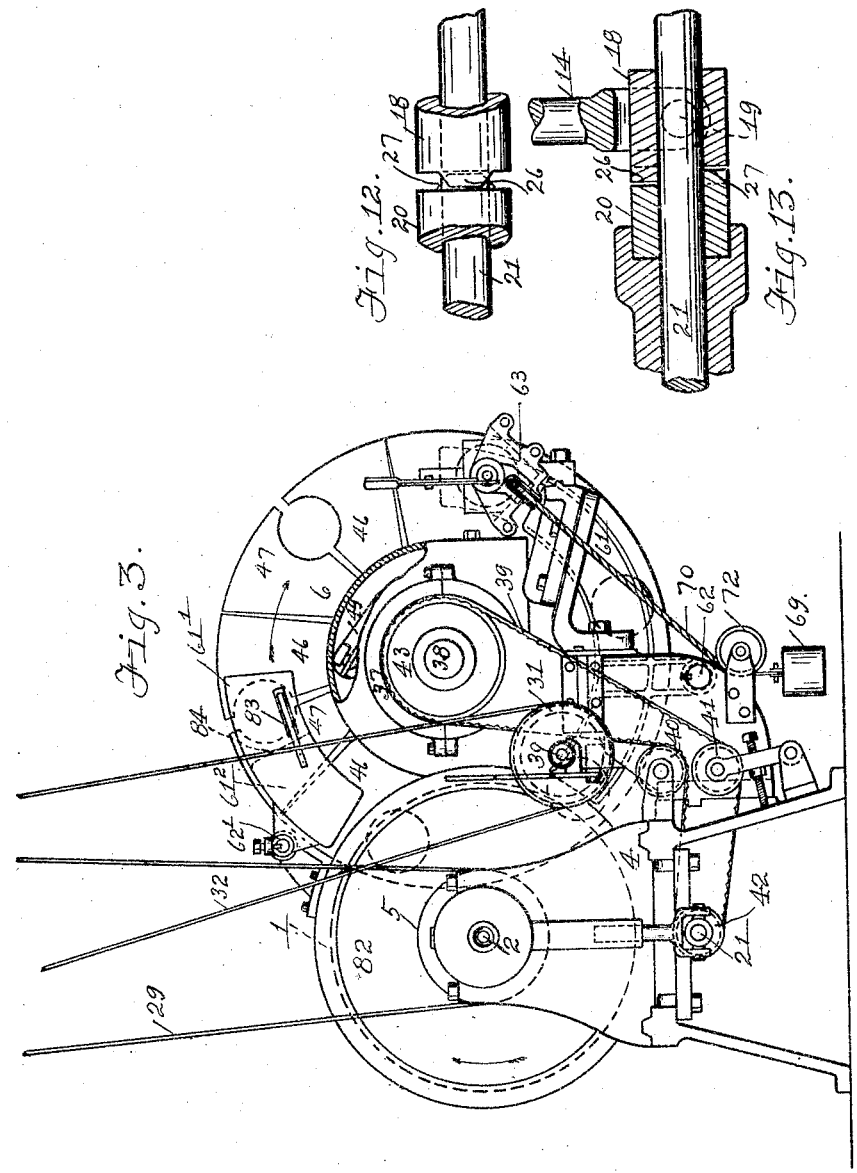

Aug. 25, 1925.　　　　　　　　　　　　　　　　　　　　1,551,155
C. E. JOHNSON
GRINDING MACHINE
Filed April 3, 1924　　　　　　6 Sheets-Sheet 5

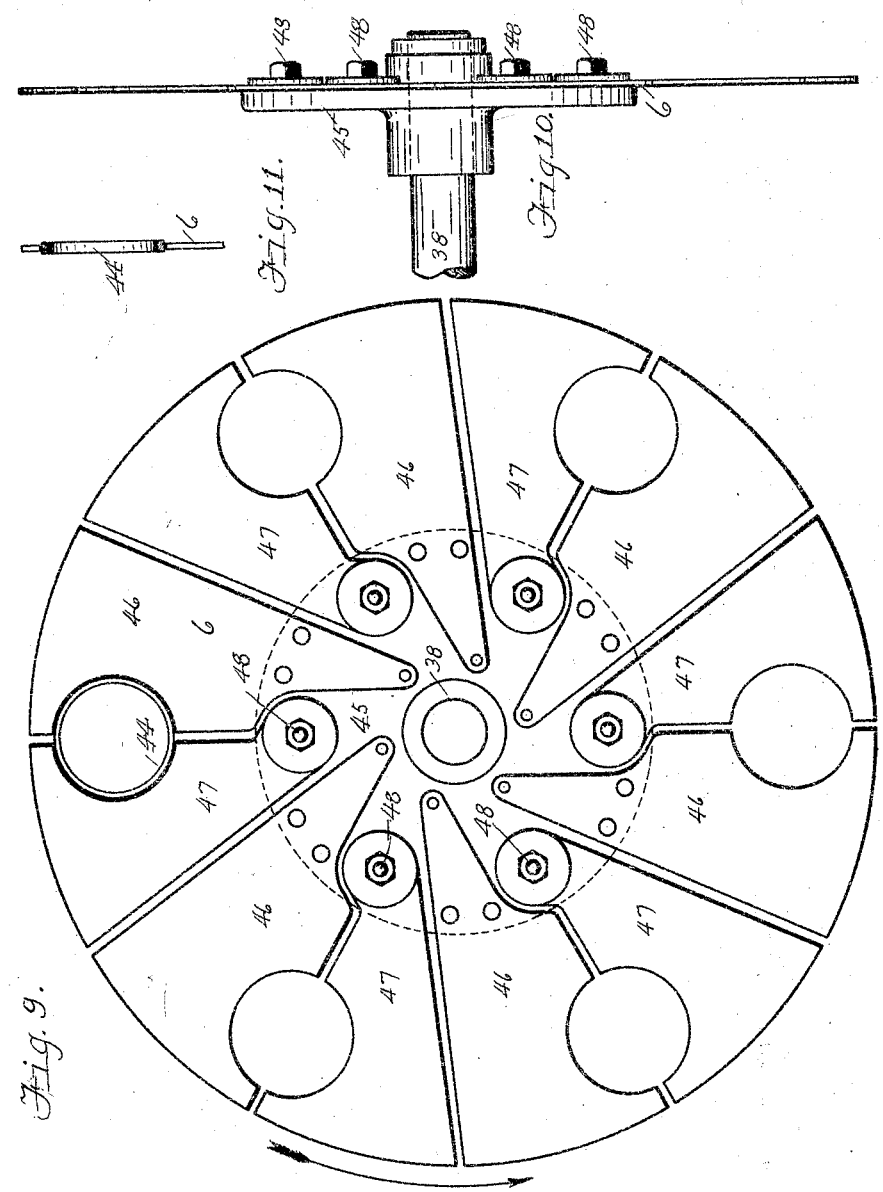

Patented Aug. 25, 1925.

1,551,155

UNITED STATES PATENT OFFICE.

CHARLES E. JOHNSON, OF MUSKEGON, MICHIGAN.

GRINDING MACHINE.

Application filed April 3, 1924. Serial No. 703,874.

*To all whom it may concern:*

Be it known that I, CHARLES E. JOHNSON, a citizen of the United States, residing at Muskegon, in the county of Muskegon and State of Michigan, have invented new and useful Improvements in Grinding Machines, of which the following is a specification.

The present invention relates to grinding machines, particularly such as are employed for grinding the opposite sides of circular bodies, such as piston rings and the like; and its object is, generally, to provide a machine of that character improved in certain respects hereinafter appearing; and more particularly, to provide such a machine having laterally-spaced grinding wheels axially movable interrelatively to receive, grind and release the work between them; and further, to provide such wheels so movable to certain pre-determined positions relatively to the work and its carrier between them; and further, to provide means for thus moving said wheels axially, and also yieldingly; and further, to provide such a machine having a work-carrier provided with swingably-connected chuck jaws and being circuitously movable to travel the work through the grinding field; and further, to provide means for holding the work tightly during a portion of the grinding operation and for permitting it to turn during another portion thereof; and further, to provide in such a machine a cam having a yielding portion operative during a part of such travel to hold the work in the chuck; and further, to provide means for adjusting the operation of such a cam; and further, to provide improved means for feeding the work to the machine.

These and any other objects hereinafter appearing are attained by, and the invention finds preferable embodiment in, the structure hereinafter particularly described in the body of this specification and illustrated by the accompanying drawings, in which:—

Figure 1 is a side view of a portion of a grinding machine;

Figure 2 is a top plan view of the same;

Figure 3 is a left hand end view thereof;

Figure 4 is an edgewise view of the work carrier of said machine showing its rotating means, mechanism for operating the movable jaw of only one of the work-holding chucks appearing in this view and certain parts being sectioned axially of the carrier's shaft;

Figure 5 is a face view of the rotating head to which the chucks are secured, showing the cam and chuck-jaw arms by which the chucks are operated, the cam element being sectioned on line 5—5 of Figure 4;

Figure 6 is a similar view of said cam, enlarged;

Figure 9 is an opposite face view of said carrier;

Figure 10 is an edgewise view thereof;

Figure 11 is a diametrically sectional view of a piston ring carried by the carrier;

Figure 12 is a top plan view of cam members whereby the grinding wheels are given a separating movement;

Figure 13 is a vertical axially-sectional view of the same;

Figure 14 is a top plan view of certain parts partially sectioned on line 14—14 of Figure 15;

Figure 15 is a side view of the same;

Figure 17 is a sectional view of the jaws of the chuck and adjacent parts, and showing means for expelling the work-piece from the chuck;

Figure 19 is a sectional view of certain parts taken on line 19—19 of Figure 2.

Figure 18:
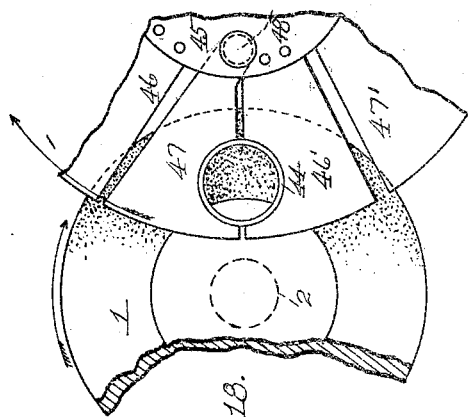
Figure 18 is a view of a modified arrangement of the jaws of the chuck.
Figure 8:
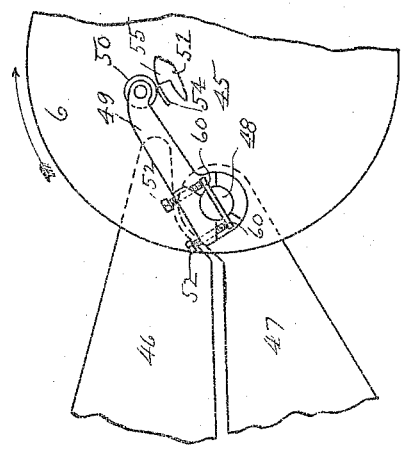
Figure 8 is a face view of a portion of said carrier and chuck jaws, enlarged.
Figure 7:
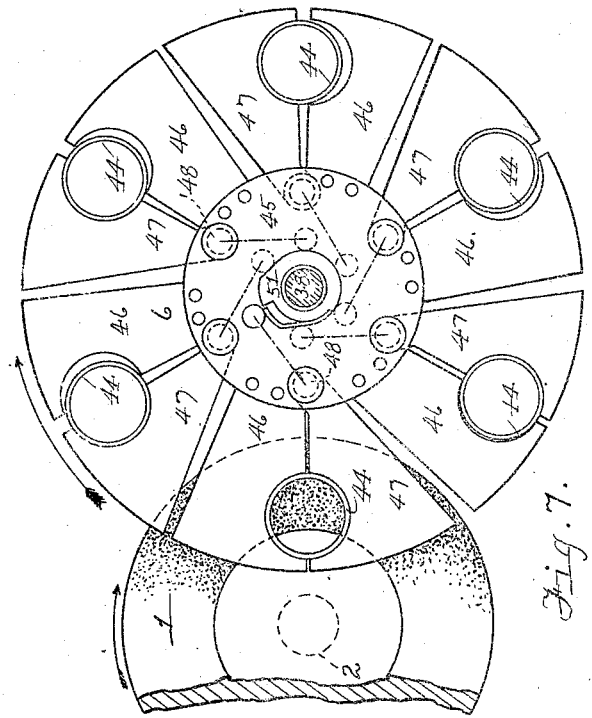
Figure 7 is a face view (somewhat diagrammatic in character) of the work-carrier, illustrating various positions of the jaws of the work-holding chucks in one position in the carrier's revolution.

In the embodiment of the invention chosen for illustration by the drawings and for detailed description in the body of this specification, a machine for grinding simultaneously the opposite sides of circular bodies, such as piston rings, is shown, said machine comprising a pair of grinding wheels 1, 1, axially spaced apart and carried by their respective shafts or axles 2, 2, rotatably mounted in bearings 3 on the machine's frame 4 and driven as by belts 29 carried by the shaft's pulleys 5. The means for operating only one of these wheels 1, (i. e., the wheel on the right-hand side of Figures 1 and 2) are completely shown in the views, but it will be understood that like means are or may be employed for operating both grinding wheels. A carrier, designated generally 6, carrying the workpieces (the piston rings 44 shown), is movable to travel said work-pieces into and out of the grinding field between the wheels 1, 1, which approach each other axially during the operation of grinding the several work-pieces carried by the carrier, and recede from each other on the completion of such grinding to receive the next workpiece into the grinding field. In the illustrated construction, and preferably, the grinding wheels approach, and recede from, each other not only interrelatively, but absolutely, for each moves axially, so that the position of the carrier 6 between the wheels is maintained at any given time in the same relation to both.

Furthermore: This approaching movement of the grinding wheels is yielding in character, and the speed thereof is limited positively, in order to prevent breaking the work-pieces or the too rapid grinding thereof. The axially-approaching movement of the grinding wheels is accomplished preferably by the following means: An axially-movable non-rotatable member or bushing 9 (Figure 19) surrounding the axle 2 and splined at 8 on the frame, carries on its opposite sides a pair of sheaves 10; the bight or middle portion of a cord 11 passes around the sheave 12 journalled on the frame of the machine, the end portions of the cord passing around said sheaves 10 respectively and carrying weights 13. It will be seen that by this mechanism the grinding wheels are pressed yieldingly toward each other and toward the carrier 6 between them, to effect the grinding operation. The receding movement of the grinding wheels is accomplished preferably by the following means: A lever 14 fulcrumed at 15 on the frame of the machine is rockingly connected at 25 to the collar 16 slidably surrounding the member 9 and abutting against the nut 17 threaded on said member. The non-rotatable cam member 18 pivotally connected at 19 to this lever is operatively engaged by the cam member 20 keyed to the shaft 21. The rotation of this shaft swings this lever outwardly thus causing the collar 16 to engage the nut 17 and force the member 9 and shaft 2 outwardly and effect the receding movement of the grinding wheel. The opposite (the approaching) movement of the grinding wheel may be limited by turning the nut 17 and the stop rod 22 threaded at 23 in the frame of the machine. It will be seen that the abutting engagement of the cams 26, 27 of the respective cam members 18 and 20 in their interrelative rotation, serves to time the speed of the approaching and receding movements of the grinding wheels in relation to the cycle of operations of the entire machine.

The shaft 21 is rotated to effect the receding movement of the grinding wheels and to permit their yielding approaching movement, by the following mechanism: The shaft 30 is driven by its pulley 31 carrying the belt 32, and rotates the worm 33 by means of the meshing bevel gears 34, 35, this worm meshing with a worm-gear 36 inside the housing 37 and on the shaft 38 on which the work-carrier 6 is mounted. This shaft 38 carries the sprocket wheel 43 carrying the chain 39 which, passing over pulleys 40, 41, is carried by the pulley 42 on the shaft 21.

The work-carrier, designated generally 6, comprises a head 45 carried by the shaft 38 and carrying work-holding chucks, each comprising a fixed jaw 46 and a movable jaw 47 pivotally connected therewith, being mounted on a shaft 48 turnable in a bearing in said head. An arm 49 is turnably-adjustably mounted on the shaft 48 and its free end, provided with a friction roller 50, travels in the turning movement of the carrier on a fixed cam, designated generally 51. This arm 49 has screws 52 oppositely disposed as to the shaft's axis and adapted to be screwed down into abutting contact with the oppositely-disposed projections 60 on this shaft 48, for the purpose of accurately adjusting the desired movement of the movable jaw 47 as governed by said cam. This work-carrier thus has a circuitous movement around the axis of its carrying shaft 38 to travel the work-pieces 44 successively into, through and out of the grinding field between the wheels 1, 1. The fixed cam 51 has a resilient portion, the spring 54, for cushioning the action of the movable jaws 47; and another portion 55 of less radial extension from the axis of the shaft 38, so that, after the principal part of the grinding of the opposite sides of the work-piece has been performed while the same is tightly but yieldingly clamped between the jaws of the chuck, the movable jaw thereof, when the roller 50 reaches and drops on the portion 55 of the cam, may recede slightly from the chuck's fixed jaw, thus permitting the work-piece during the latter portion of the grinding thereof to turn in the chuck, so that any inequality in its thickness may be eliminated.

A pair of guides 61 for holding the work-pieces against lateral displacement from the chucks before being clamped thereby, are non-turnably mounted slidably on the rod 62 on the frame 4, on opposite sides of the carrier, and may be moved toward and away from the carrier 6 to accommodate work-pieces of different thickness, and may be clamped in adjusted position by screws 80 passing through their split-apart ears 81.

Means for automatically feeding the work-pieces to the chucks are provided. Such means in the construction illustrated, comprise the following: the feed chute 63; the plunger 64 longitudinally movable in feeding direction along the chute and abutting at 65 the work-pieces therein and having an arm 66 extending first upwardly and then in the direction of the feeding and laterally of the work-pieces in the chute, said arm having adjacent its extremity a transverse slide bearing 67; and a hollow-second plunger 68 containing slidably the first plunger and pressed in feeding direction, as by the weight 69 sustained by the cord 70 passing over pulleys 71, 72, said plunger being adapted to engage a stop portion 73 on the first plunger; and a plate 74 slidable in the bearing 67 to a position between adjacent work-pieces in the chute. A pair of levers 75, 76 pivotally connected in their middle portions and to the two plungers respectively at 77 and 78 are provided. It will be seen that the weight 69 presses the second plunger (to which the cord 70 is attached) to cause it to abut the stop 73 of the first plunger 64 and thus moves the work-pieces in feeding direction; and that the handles 79 of the levers 75, 76 may be pressed together and the plate 74 slid down between adjacent work-pieces in the chute, whereupon additional work-pieces may be inserted between said plate and the vertical portion of the arm 66, all without interrupting the feeding operation.

Figure 16:
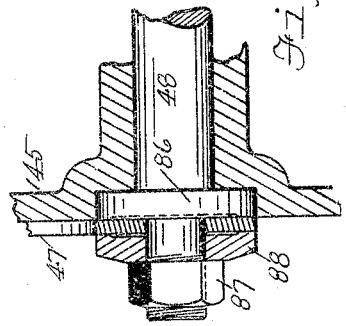
Figure 16 is a view of the shaft whereon the movable jaw of the chuck is carried, adjacent parts being shown in section.

A pair of guides $61^1$, $61^2$, similar to the guides 61 and similarly disposed and non-turnably mounted slidably on the rod $62^1$ supported on the casings 82 of the grinding wheels, are provided for holding the work-pieces from lateral displacement from the chucks after being ground. The longer guide $61^1$ carries a spring 83 bearing against the chuck jaws and the work-piece therein and serves to discharge the ground work-piece laterally from the chuck after the same in the carrier's rotation reaches and passes the end 84 of the shorter guide $61^2$, whereupon it may fall into the delivery chute indicated at 85. The shaft 48 whereby the movable jaw of the work-holding chuck is carried is desirably provided with an annular extension 86 against which the movable jaw 47 may be securely clamped by the nut 87 threaded on the end of this shaft, having the washer 88, as seen in Figure 16. By this provision, said movable jaw (turnable about said shaft when not thus clamped) may be turnably adjusted to any desired position thereon, thus making it possible to thus adjust the parts interrelatively to take up any wearing thereof which may occur in practice.

In Figure 18 is shown a modified construction or a transposition of parts from their positions seen in other views. In this Figure 18, the fixed jaw $46^1$ of the work-holding chuck follows the movable jaw $47^1$ in the travel of the work-piece through the grinding field. In this view, therefore, the work-piece is pushed unyieldingly into and through the grinding operation by the fixed jaw; whereas, in other views, the work-piece is pushed yieldingly by the movable jaw behind it, acted upon by the spring 54 of the cam 51.

The invention being intended to be pointed out in the claims, is not to be limited to or by details of construction of the particular embodiment thereof illustrated by the drawings or hereinbefore described.

I claim:

1. In a machine of the character described: a frame; a sheave rotatable thereon; a grinding wheel carried by the frame and having an axle longitudinally movable; a carrier having a work-holding chuck and movable to travel the work therein into and out of grinding relation with the wheel; an axially-movable member engaging the axle and carrying a pair of sheaves on the opposite sides of its axis; a cord whose middle portion passes around the first-mentioned sheave and whose end portions respectively pass around said pair of sheaves and carry weights for axially moving the axle.

2. In a machine of the character described: laterally-spaced grinding wheels; a carrier having a work-holding chuck and turnable to travel the work therein through the grinding field between the wheels; means for holding the work against turning movement in the chuck during a portion of its travel through said field and for releasing it turnably in the chuck during another portion of its travel through said field.

3. In a machine of the character described: laterally-spaced grinding wheels; a carrier having a work-holding chuck, comprising a movable jaw, and turnable to travel the work through the grinding field between the wheels; a fixed cam; means operable by the cam for moving and holding said jaw in clamping relation to the work during a portion of its travel through said field and for releasing said jaw to permit the turning movement of the work in the chuck during another portion of its travel through said field.

4. In a machine of the character described: laterally-spaced grinding wheels; a carrier having a work-holding chuck, comprising a movable jaw, and turnable to travel the work through the grinding field between the wheels; a fixed cam having a resilient portion; means operable by the cam for moving and holding said jaw in clamping relation to the work during a portion of its travel through said field and for releasing said jaw to permit the turning movement of the work in the chuck during another portion of its travel through said field.

5. In a machine of the character described: laterally-spaced grinding wheels; a carrier having a work-holding chuck and movable to travel the work into and out of the grinding field between the wheels; a pair of guides on opposite sides respectively of the carrier and movable toward and away from the carrier to adjusted positions, to hold the work against lateral displacement from the chuck.

6. In a machine of the character described: laterally-spaced grinding wheels; a carrier having a work-holding chuck comprising a jaw carried by a turnable shaft having oppositely disposed projections; a fixed cam; an arm turnably mounted on the shaft and having a free end operatively traveling on the cam, and adjusting screws on the opposite sides respectively of the shaft's axis engaging said projections respectively; the carrier being movable to travel the work into and out of the grinding field between the wheels.

7. In a machine of the character described; feeding apparatus comprising: a chute; a plunger longitudinally movable in feeding direction along the chute and abutting the work-pieces therein and having an arm extending in feeding direction laterally of the work-pieces in the chute, said arm being provided adjacent its extremity with a transverse slide bearing; a second plunger pressed in feeding direction parallely with the first plunger and adapted to engage a stop thereon; means engaging the plungers for imparting thereto a relative movement of the first plunger in feeding direction and the second plunger in reverse direction; a plate slidable in the slide bearing to a position between adjacent work-pieces in the chute.

8. In a machine of the character described, feeding apparatus comprising: a chute; a plunger longitudinally movable in feeding direction along the chute and abutting the work-pieces therein and having an arm extending in feeding direction laterally of the work-pieces in the chute, said arm being provided adjacent its extremity with a transverse slide bearing; a second plunger pressed in feeding direction parallely with the first plunger and adapted to engage a stop thereon; a plate slidable in the slide bearing to a position between adjacent work-pieces in the chute.

9. In a machine of the character described: a grinding wheel; a carrier having a work-holding chuck and movable to travel the work therein into grinding relation with the wheel; means for holding the work against turning movement in the chuck during a portion of the grinding thereof and for releasing it turnably in the chuck during another portion of the grinding thereof.

10. In a machine of the character described: laterally-spaced grinding wheels; a carrier having a work-holding chuck and movable to travel the work into and out of the grinding field between the wheels; a spring mounted extraneously of the carrier and pressing the finished work laterally out of the chuck.

11. In a machine of the character described: a grinding wheel; a carrier having a work-holding chuck and movable to travel the work therein into grinding relation with the wheel, the chuck being adapted to hold the work freely turnably in the grinding thereof.

12. In a machine of the character described: a frame; a grinding wheel carried by the frame and having an axle longitudinally movable; a carrier having a work-holding chuck and movable to travel the work therein into and out of grinding relation with the wheel; a movable member engaging the axle and adapted to move it axially; means for adjustably limiting the movement of said member in one direction and means, operated independently of said first-mentioned means, for limiting the movement of said member in the opposite direction.

13. In a machine of the character described: a frame; a grinding wheel carried by the frame and having an axle longitudinally movable; a carrier having a work-holding chuck and movable to travel the work therein into and out of grinding relation with the wheel; a movable member engaging the axle and adapted to move it axially; means for moving said member and for adjustably limiting its movement, comprising: a nut threaded on said member; a lever fulcrumed in connection with the frame and adapted to be swung into engaging relation with the nut; an adjustable stop for limiting the opposite swinging movement of the lever.

14. In a machine of the character described: a frame; a grinding wheel carrier by the frame and having an axle longitudinally movable; a carrier having a work-holding chuck and movable to travel the work therein into and out of grinding relation with the wheel; a movable member engaging the axle and adapted to move it axially; means for moving said member and for adjustably limiting its movement, comprising: a nut threaded on said member; a lever fulcrumed in connection with the frame and adapted to be swung into engaging relation with the nut; an adjustable stop for limiting the opposite swinging movement of the lever; a cam for swinging the lever in its nut-engaging direction.

15. In a machine of the character described: a frame; a grinding wheel carried by the frame and having an axle longitudinally movable; a carrier having a work-holding chuck and movable to travel the work therein into and out of grinding relation with the wheel; a movable member engaging the axle and adapted to move it axially; means for moving said member and for adjustably limiting its movement, comprising: a nut threaded on said member; a lever fulcrumed in connection with the frame and adapted to be swung into engaging relation with the nut; a cam adapted to swing the lever in its nut-engaging direction and to limit its swinging movement in the opposite direction.

In testimony whereof I have hereunto set my hand at Grand Rapids, Michigan, this 31st day of March, 1924.

CHARLES E. JOHNSON.